United States Patent [19]

Schreurs et al.

[11] 4,308,186

[45] Dec. 29, 1981

[54] REFLECTOR COATING COMPOSITION FOR FLUORESCENT LAMPS

[75] Inventors: Willy P. Schreurs, Danvers; Liviu Magian, Manchester, both of Mass.

[73] Assignee: North American Philips Corporation, New York, N.Y.

[21] Appl. No.: 166,518

[22] Filed: Jul. 7, 1980

[51] Int. Cl.$^3$ ............................................. C08L 71/02
[52] U.S. Cl. ...................... 260/29.2 EP; 106/287.19; 313/221; 427/67
[58] Field of Search .............................. 260/29.2 EB; 106/287.19; 427/67; 313/221

[56] References Cited

U.S. PATENT DOCUMENTS

| | | | |
|---|---|---|---|
| 2,901,375 | 8/1957 | Patterson et al. | 427/67 |
| 3,226,249 | 12/1965 | Van Bakel et al. | 117/119.6 |
| 3,535,138 | 10/1970 | Wanmaker et al. | 117/33.5 |
| 4,148,935 | 4/1979 | Schreurs | 427/67 |

FOREIGN PATENT DOCUMENTS 1441900  7/1976  United Kingdom .

*Primary Examiner*—Theodore E. Pertilla
*Attorney, Agent, or Firm*—Robert S. Smith

[57] ABSTRACT

An essentially water-base coating to form reflective films on the inner wall of fluorescent lamps is prepared from a dispersion of TiO$_2$ in a vehicle comprising a water solution of an organic binder, a volatile organic non-solvent of the binder at room temperature and additions of cationic and nonionic surfactants.

9 Claims, 1 Drawing Figure

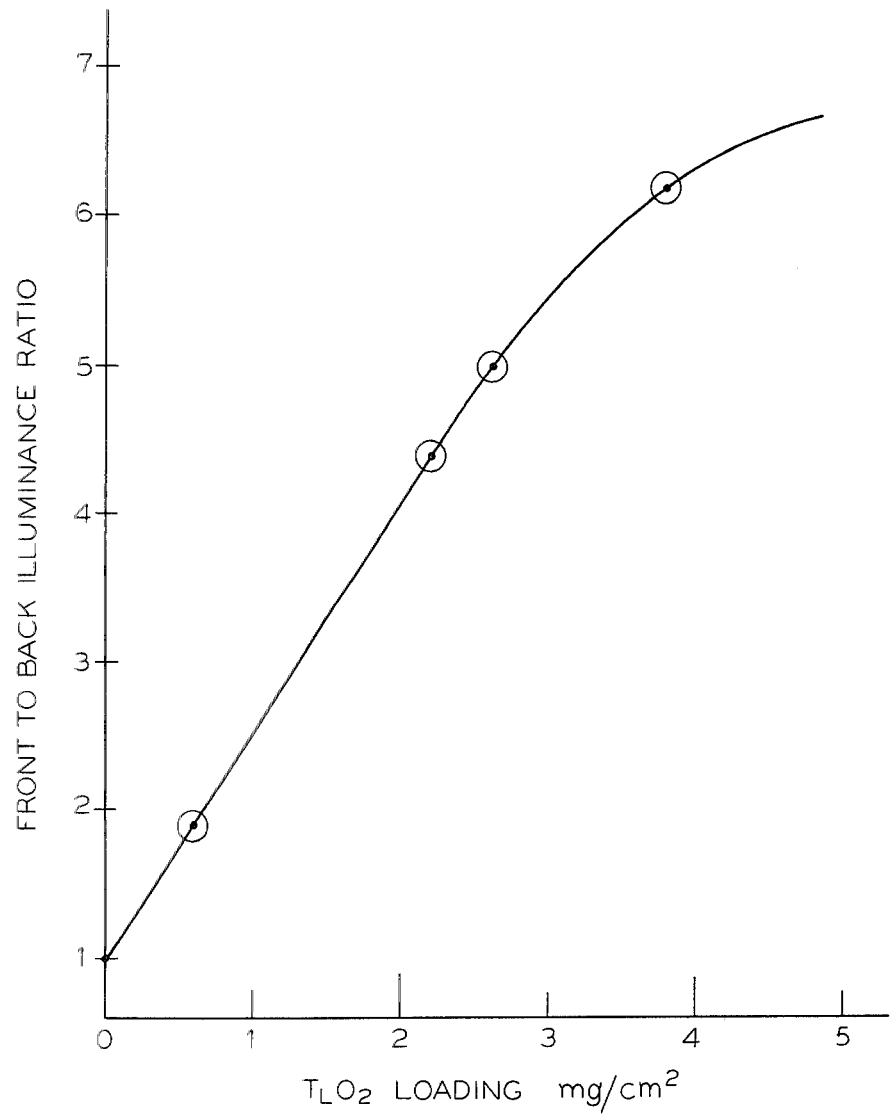

REFLECTOR COATING COMPOSITION FOR FLUORESCENT LAMPS

BACKGROUND OF THE INVENTION

This invention relates to reflector fluorescent lamps wherein part of the envelope is coated internally with a reflective film extending longitudinally through the length of the lamp but covering only part of the periphery.

DESCRIPTION OF THE PRIOR ART

Internal reflective films have long been used to enhance the forward brightness of the fluorescent lamps. In one version of the "reflector lamp" a phosphor film is laid over the reflective film and over the portion of the bulb not covered by the reflective film. In another version, referred to as "aperture lamps", the phosphor film is deposited over the reflective film only so that one longitudinal portion of the bulb appears void of coating.

In both types of lamps the first film to be deposited on the bulb wall is the reflective film.

The properties and the requirements of the reflective materials and of the reflective films made thereof are detailed in U.S. Pat. No. 2,854,600.

Because of its high refractive index $TiO_2$ has universally been adopted by fluorescent lamp manufacturers for producing reflector and aperture lamps emitting in the visible region of the light spectrum.

The method by which these $TiO_2$ reflective films are deposited in the elongated glass envelopes are reviewed in U.S. Pat. No. 2,901,375. Whatever the method used in depositing the wet film of $TiO_2$ suspension the critical part of the process is the drying.

As the drying is always achieved with the coated bulbs held in a vertical position coating defects described as "streaks" and "drapes" readily occur due to excessive flow of the coating or due to uneven drying from the edge to the center and from end to end of the film. The $TiO_2$ coating suspensions in the prior art all use nitrocellulose as the binding agent. The superiority of nitrocellulose may be attributed to its availability in many viscosity ranges and certainly to the great variety of possible solvents. As many as four different solvents have been used in one composition to achieve a graded evaporation rate and overcome the coating defects.

One drawback of the use of nitrocellulose as binding agent for reflector films is that it requires a baking operation prior to applying the overlaying phosphor film. Even when the $TiO_2$ film has been baked out the subsequent baking of the phosphor film covering the $TiO_2$ film requires higher temperatures than those normally used in processing a single phosphor film.

It is presumed that the vehicle of the phosphor coating impregnates the previously baked $TiO_2$ film which is highly porous thereby causing a very difficult lehring of the organic matters therein. The voids in a $TiO_2$ film can be estimated from the figures given in U.S. Pat. No. 2,854,660 where a coating weight of 2 mg per square cm has a thickness of 10 microns whereas a solid layer of $TiO_2$ at 3.8 density would have a thickness of 5.2 microns, hence a reflector film made of fine $TiO_2$ particulates has approximately 50% voids.

As the thickness of the reflector film increases the removal of all organic matters through the lehring operation becomes more critical. Consequently the reflector films in fluorescent lamps have been limited to a practical loading of less than 3 $mgTiO_2$ per square centimeter which does not achieve the maximum possible reflectivity.

SUMMARY OF THE INVENTION

The invention discloses a novel and superior coating composition for depositing $TiO_2$ reflector films on the inner wall of fluorescent lamps.

The binder used in the coating according to the invention is a medium viscosity grade Polyoxyethylene which is soluble in water but not in methanol at room temperature. In order to avoid texture defects in the reflective film the vehicle in the coating according to the invention is a mixture of a water solution of polyoxyethylene and methanol. As the evaporation rate of methanol is approximately six (6) times faster than water the film is rapidly set at room temperature without any forced air. The final drying is obtained with forced air at room temperature thereby eliminating the need of heated air common to all water-base coatings used in the fluorescent lamp industry.

A further advantage of the coating according to the invention is the energy saving resulting from the elimination of one lehring operation between the reflector film coating and the overlaid phosphor film.

Still a further advantage of the new coating is the possibility of increasing the thickness of the $TiO_2$ film, and thereby the forward efficiency of the reflector lamp, without increasing the lehring temperature of the single lehring operation.

BRIEF DESCRIPTION OF THE DRAWING

The drawing shows the relationship between the front to back illuminance ratio of fluorescent lamps with a 235° reflector and the thickness of the $TiO_2$ reflective film.

The reflective film loadings are expressed in mg $TiO_2$ per square centimeters and the illuminance ratios were obtained by surface brightness measurements in the center of the non reflective and reflective areas of the lamps.

DESCRIPTION OF THE PREFERRED EMBODIMENT

The binder solution is prepared by dissolving at room temperature the polyoxyethylene in deionized water in such proportions as to obtain a 5 percent weight by volume solution.

In order to avoid an excessive viscosity in the final coating the polyoxyethylene is a medium viscosity type such as POLYOX WSRN-750 sold by Union Carbide Chemicals.

The vehicle of the coating is prepared by mixing together:
278 ml of the binder solution
1020 ml of methanol
50 ml deionized water
12 ml of cationic surfactant
12 ml of nonionic surfactant.

As the binder contains a certain amount of $CaCO_3$ the pH of the vehicle is usually greater than 9.0. A small addition of acetic acid of the order of 2 ml is needed to lower the pH between 6.0 and 6.5.

The preferred cationic surfactant is an ethoxylated amine such as TOMAH E-S-15 sold by TOMAH PRODUCTS, INC. and the nonionic surfactant is chosen amongst the group of polyols exhibiting defoaming properties such as PLURONIC 31R1 made by BASF WYANDOTTE.

The surfactants and the pH of the final coating have been found critical in achieving the wetting of the glass during the reflector coating operation and the adherence of the subsequent phosphor coating overlaying the reflective film after the latter is dried. The vehicle and 520 g anatase $TiO_2$ pigment having an average particle size of 0.3 microns are milled for 8-hours in a one gallon pebble mill.

The reflector coating so prepared had a specific gravity of 1.180 and a viscosity of 18.4 seconds measured with ZAHN #2 cup at 17° C.

It has been found that a titania coating is particularly desirable which has a polyoxyethylene binder which has an approximate molecular weight of 300,000. Ordinarily the binder constitutes 2.5 to 3.0 percent of the titania and preferably 2.7% and the vehicle of the coating contains between 50 and 90 percent methanol and preferably 75 percent. The titania coating has also been found to advantageously have a $TiO_2$ content between 0.3 and 0.4 g/ml and preferably 0.35 g/ml. The reflector film in accordance with the invention is particularly desirable when the coating has a quantity of $TiO_2$ greater than 3.5 mg $TiO_2$ per square cm.

Reflective films produced by the roll-coating method well known in the art dried with the bulbs in a vertical position initially without any forced air. The reflective film becomes set in approximately 10 minutes even in ambient air as low as 17° C. After the setting period the residual water in the $TiO_2$ film can be rapidly evaporated by forcing air, at room temperature, through the coated bulbs.

The reflector coated dried bulbs are overcoated with a phosphor coating and the lamps processed by the methods well known in the art, the only requirement being that the second coating does not contain water which would redissolve the first coating. The alternate method of manufacturing reflector films in fluorescent lamps consists in fully coating the inner wall of the bulb with a $TiO_2$ suspension and after the film is dried scraping the part of bulb to be left void of $TiO_2$. This method is preferred whenever the aperture in the reflective film is very narrow.

The $TiO_2$ films prepared with organic vehicles such as nitro-cellulose or ethylcellulose solutions are very difficult to "scrape off" and require at least a partial baking to ease the scraping and avoid forming jagged edges.

The reflective film according to the invention is easily scraped off with a relatively soft plastic scraper and does not require any baking prior to the scraping operation thereby saving the energy needed for the baking.

As the thickness of the $TiO_2$ reflective film is increased the ratio of front to back illuminance of the lamp also increases as shown in the drawing. For any given ambient temperature the thickness of the film is a function of the specific gravity and viscosity of the coating and these can be varied by changing the proportions of vehicle and $TiO_2$ in the coating composition. Whereas the prior art has been limited to $TiO_2$ films at 2 to 2.5 mg/cm² the new coating can easily produce coatings at 4 mg/cm² and higher.

The higher loadings of the $TiO_2$ reflective films result in higher front to back illuminance ratios and hence in more efficient reflector lamps.

The superiority of the reflector lamps made with the reflective coating according to the invention is demonstrated by the results in the following table.

Illumination readings were obtained with a photocell placed 3 meters away from a commercial 2 lamp fixture in a walnut panelled room.

|  | Front to Back Ratio | Foot-Lamberts |
| --- | --- | --- |
| Regular 40W Cool White lamps - no reflector | 1.0 | 133 |
| Experimental 235° Reflector at 3.8 mg/cm² - Cool White | 6.2 | 163 |
| Experimental 235° Reflector at 2.7 mg/cm² - Cool White | 5.0 | 159 |
| Experimental 235° Relfector at 2.1 mg/cm² - Cool White | 4.6 | 156 |
| Manufacturer A - 235° Reflector - Cool White | 4.7 | 157 |
| Manufacturer B - 220° Reflector - Cool White | 5.3 | 153 |

The correlation between the lighting efficiency of the fixture and the loading of the $TiO_2$ reflective film is clearly shown by the 3 experimental reflector coatings which had identical phosphor coatings and lamp characteristics.

What we claim as new and desire to secure by Letters Patent of the United States is:

1. A novel composition for a titania coating to be used in laying reflective films in fluorescent lamps said coating consisting of a dispersion of anatase $TiO_2$ into a vehicle made of a mixture of a water solution of polyoxyethylene binder, a volatile alcohol non-solvent of the polyoxyethylene at room temperature and a combination of cationic and nonionic surfactants.

2. A titania coating according to claim 1 wherein the polyoxyethylene binder has an approximate molecular weight of 300,000 said binder being in the proportions of 2.5 to 3.0 percent of the titania and where the vehicle of the coating contains between 50 and 90 percent methanol.

3. A titania coating made of a $TiO_2$ dispersion in a vehicle according to claims 1 or 2 said vehicle comprising 0.5 to 1% by volume of cationic and anionic surfactants and a sufficient amount of acetic acid to obtain a pH between 6.0 and 6.5.

4. A titania coating according to claims 1 or 2 where the $TiO_2$ content ranges from 0.3 to 0.4 g/ml.

5. A reflector film obtained from a coating according to claims 1 or 2 and having a quantity of $TiO_2$ greater than 3.5 mg $TiO_2$ per square cm.

6. A titania coating according to claim 2 wherein the vehicle of the coating contains 75% methanol.

7. A titania coating according to claim 4 wherein the $TiO_2$ content is 0.35 g/ml.

8. A titania coating according to claim 3 wherein said vehicle comprises 0.8% of cationic and anionic surfactants.

9. A titania coating according to claim 2 wherein said binder is in the proportion of 2.7%.

* * * * *